US012646756B2

(12) United States Patent
Lee

(10) Patent No.: US 12,646,756 B2
(45) Date of Patent: Jun. 2, 2026

(54) DEVICE FOR WITHSTAND PRESSURE EVALUATION OF SECONDARY BATTERY AND METHOD FOR EVALUATING WITHSTAND PRESSURE

(71) Applicant: Kang Min Lee, Cheongju-si (KR)

(72) Inventor: Kang Min Lee, Cheongju-si (KR)

( * ) Notice: Subject to any disclaimer, the term of this patent is extended or adjusted under 35 U.S.C. 154(b) by 260 days.

(21) Appl. No.: 18/376,811

(22) Filed: Oct. 4, 2023

(65) Prior Publication Data

US 2024/0120559 A1      Apr. 11, 2024

(30) Foreign Application Priority Data

Oct. 11, 2022     (KR) ......................... 10-2022-0129780
Aug. 25, 2023     (KR) ......................... 10-2023-0112154

(51) Int. Cl.
H01M 10/42     (2006.01)
*G01K 17/00*     (2006.01)
*H01M 50/105*     (2021.01)

(52) U.S. Cl.
CPC ........ H01M 10/4285 (2013.01); *G01K 17/00* (2013.01); *H01M 50/105* (2021.01)

(58) Field of Classification Search
CPC .. H01M 10/4285; H01M 50/105; G01L 17/00
See application file for complete search history.

(56) References Cited

U.S. PATENT DOCUMENTS

| | | | | |
|---|---|---|---|---|
| 8,557,421 | B2 * | 10/2013 | Hardwick ......... | H01M 10/4285 |
| | | | | 324/426 |
| 10,741,870 | B2 * | 8/2020 | Park ...................... | H01M 10/42 |
| 11,437,658 | B2 * | 9/2022 | Hwang ............... | H01M 50/136 |
| 11,561,152 | B2 * | 1/2023 | Kim ................... | H01M 10/4285 |

(Continued)

FOREIGN PATENT DOCUMENTS

| | | |
|---|---|---|
| JP | 10-340710 | 12/1998 |
| KR | 10-2010-0118394 | 11/2010 |

(Continued)

OTHER PUBLICATIONS

English Specification of 10-2010-0118394.

(Continued)

*Primary Examiner* — Justin N Olamit
(74) *Attorney, Agent, or Firm* — ANTONIO HA & U.S. PATENT, LLC

(57)     ABSTRACT
The present disclosure relates to a device for withstand pressure evaluation of secondary battery and a method for evaluating withstand pressure using the same to ensure the stability of the product by evaluating the withstand pressure of the pouch constituting the secondary battery, and the device includes a storage configured to have a storage space in which the secondary battery is stored, a spacer configured to adsorb and then pull one side of the secondary battery to form an internal space of the secondary battery, an injector configured to be installed in the spacer and pierce the secondary battery with a needle with an air injection channel formed therein, and inject air at positive pressure into the internal space of the secondary battery through the air injection passage, and a pressure measuring unit configured to measure air pressure in the internal space connected to the air injection passage.

12 Claims, 9 Drawing Sheets

(56)           References Cited

U.S. PATENT DOCUMENTS

| | | | |
|---|---|---|---|
| 12,111,197 B2 * | 10/2024 | Bruder | .................... G01F 23/00 |
| 2025/0164228 A1 * | 5/2025 | Jang | ........................ G01B 5/30 |

FOREIGN PATENT DOCUMENTS

| | | |
|---|---|---|
| KR | 10-2021-0071330 | 6/2021 |
| KR | 10-2285961 | 8/2021 |
| KR | 10-2021-0143603 | 11/2021 |

OTHER PUBLICATIONS

English Specification of 10-2021-0143603.
English Specification of JP10-340710.
English Specification of 10-2021-0071330.
English Specification of 10-2285961.

* cited by examiner

DEVICE FOR WITHSTAND PRESSURE EVALUATION OF SECONDARY BATTERY AND METHOD FOR EVALUATING WITHSTAND PRESSURE

CROSS-REFERENCE TO RELATED APPLICATION(S)

This application claims priority to Korean Patent Application Nos. 10-2022-0129780, filed on Oct. 11, 2022, and 10-2023-0112154, filed on Aug. 25, 2023, in the Korean Intellectual Property Office, the disclosures of which are incorporated by reference herein in their entireties.

TECHNICAL FIELD

The present disclosure relates to a device for withstand pressure evaluation of secondary battery and a method for evaluating withstand pressure using the same, and more specifically, to a device for withstand pressure evaluation of secondary battery and a method for evaluating withstand pressure using the same to ensure the stability of the product by evaluating the withstand pressure of the pouch constituting the secondary battery.

DISCUSSION OF RELATED ART

In general, secondary batteries refer to batteries that can be charged and discharged, unlike non-rechargeable battery primary batteries, and are widely used in electronic devices such as mobile phones, laptop computers, camcorders, and electric vehicles.

In particular, lithium secondary batteries have a larger capacity than nickel-cadmium batteries or nickel-hydrogen batteries, which are widely used as power sources for electronic equipment, and their high energy density per unit weight so that their use is rapidly increasing.

Lithium secondary batteries mainly use lithium-based oxide and carbon material as positive and negative electrode active materials, respectively.

Lithium secondary batteries include an electrode assembly in which a positive electrode plate and a negative electrode plate each coated with a positive electrode active material and a negative electrode active material are disposed with a separator in between, and an exterior material, that is, a battery case, that seals and stores the electrode assembly together with an electrolyte solution.

Depending on the shape of the exterior material, these lithium secondary batteries can be classified into a can-type secondary battery in which the electrode assembly is embedded in a metal can and a pouch-type secondary battery in which the electrode assembly is embedded in a pouch of an aluminum laminate sheet.

During the manufacturing process of a pouch-type secondary battery, an electrode assembly including a cathode, separator, and anode is placed into the pouch exterior material, electrolyte is injected, and the edges are sealed. Next, the battery is activated through several charge and discharge cycles.

During this process, gas is generated inside the cell, and in order to collect the gas generated at this time, the size of the pouch exterior material of the pouch-type secondary battery before the activation process is formed to be larger than that of the final product.

A portion of the pouch exterior material that is larger than the portion where the electrode assembly is placed is referred to as a gas pocket portion, and gas generated during the activation process may be collected in this gas pocket portion.

After the activation process is completed, a hole is made in the gas pocket portion to remove the gas, then the gas pocket portion is cut, and the pouch exterior material is resealed to meet the final product specifications.

Meanwhile, pouches for secondary batteries have different withstand pressure depending on their material, manufacturing size, etc. of the secondary battery. This withstand pressure is proportional to the sealing force of the pouch.

Further, in secondary batteries, sealing force is proportional to safety. If the sealing force is weak or defective, it can lead to a fire, resulting in property loss and casualties.

SUMMARY

The present disclosure is derived to address the issues of the prior art described above, and the present disclosure is to provide a device for withstand pressure evaluation of secondary battery and a method for evaluating withstand pressure using the same, which can evaluate the withstand pressure of the pouch constituting the secondary battery to identify the sealing force, thereby ensuring the stability of the product.

The device for withstand pressure evaluation of secondary battery according to the present disclosure includes a storage configured to have a storage space in which the secondary battery is stored, a spacer configured to adsorb and then pull one side of the secondary battery to form an internal space of the secondary battery, an injector configured to be installed in the spacer and pierce the secondary battery with a needle with an air injection channel formed therein, and inject air at positive pressure into the internal space of the secondary battery through the air injection passage, and a pressure measuring unit configured to measure air pressure in the internal space connected to the air injection passage.

Further, the storage includes a storage main body having the storage space and including a first support plate supporting one side of the secondary battery and first expansion allowance holes on both sides of the first support plate to allow expansion of the secondary battery and a cover part opening and closing the storage space of the storage main body and including a second support plate supporting the secondary battery on the opposite side of the secondary battery to which the first support plate is in contact and second expansion allowance holes on both sides of the second support plate to face the first expansion allowance holes, respectively, and allow expansion of the secondary battery.

Further, a lifting hole is formed in the cover part through which the spacer is lifted.

Further, the spacer includes a lifting block including a moving guide hole guiding the movement of the needle and at least one intake hole applying an adsorption force to the secondary battery, an adsorption unit coupled to the lifting block to face the secondary battery and including a first connection hole connected to a movement guide hole, which is through which the needle passes and a second connection hole connected one-to-one with the intake hole, a moving drive unit moving the lifting block so that the needle moves closer to or farther away from the secondary battery while allowing the adsorption unit to contact or separate from the secondary battery, and a suction control unit connected to the intake hole and sucking the secondary battery to the adsorption unit through air intake when the adsorption unit contacts the secondary battery.

Further, the adsorption unit includes a first adsorption ring coupled to the lifting block and having the first connection hole formed thereon and a second adsorption ring coupled to the lifting block and arranged to be concentric with the first adsorption ring, having a larger diameter than the diameter of the first adsorption ring, having the first adsorption ring located in the internal space thereof, and having a second connection hole.

Further, the injector further includes a housing receiving certain area of the needle and having a third connection hole connected to the air injection passage, an air supply unit supplying air to the air injection passage through the third connection hole, and a needle-driving unit moving the housing in the direction of the secondary battery so that the needle pierces the secondary battery.

Further, the device further includes a plurality of packing parts configured to be mounted on the outer periphery of the housing to be spaced apart from each other, wherein the outer periphery is in close contact with the inner periphery of the spacer.

Further, when the air supply unit is not operating, the pressure in the inside of the pouch; and a space between the outside of the needle and the packing part is maintained at atmospheric pressure.

Further, the device further includes an adsorption unit configured to be installed in the storage to adsorb and fix the secondary battery on the opposite side of the secondary battery that the spacer is in contact with.

The method for evaluating withstand pressure of a secondary battery according to the present disclosure includes step (a) of adsorbing and then pulling, by a spacer, one side of the secondary battery to form an internal space of the secondary battery, step (b) of punching the secondary battery with a needle having an air injection passage formed therein and then injecting, by an air supply unit, air into the internal space of the secondary battery through the air injection passage, and step (c) of measuring, by a pressure measuring unit, the air pressure of the air injection passage.

Further, the method includes, before or after step (a), a step of adsorbing, by an adsorption unit installed in a storage, the secondary battery on the opposite side of the secondary battery that is in contact with a spacer.

Further, step (b) includes step (b1) of moving and inserting the needle into the secondary battery and step (b2) of operating, when the needle is inserted into the secondary battery, the air supply unit to inject air into the secondary battery.

The device for withstand pressure evaluation of secondary battery according to the present disclosure and method for evaluating withstand pressure using the same has the effect of evaluating the withstand pressure of the pouch constituting the secondary battery to identify the sealing force, thereby ensuring the stability of the product.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Figure 1:
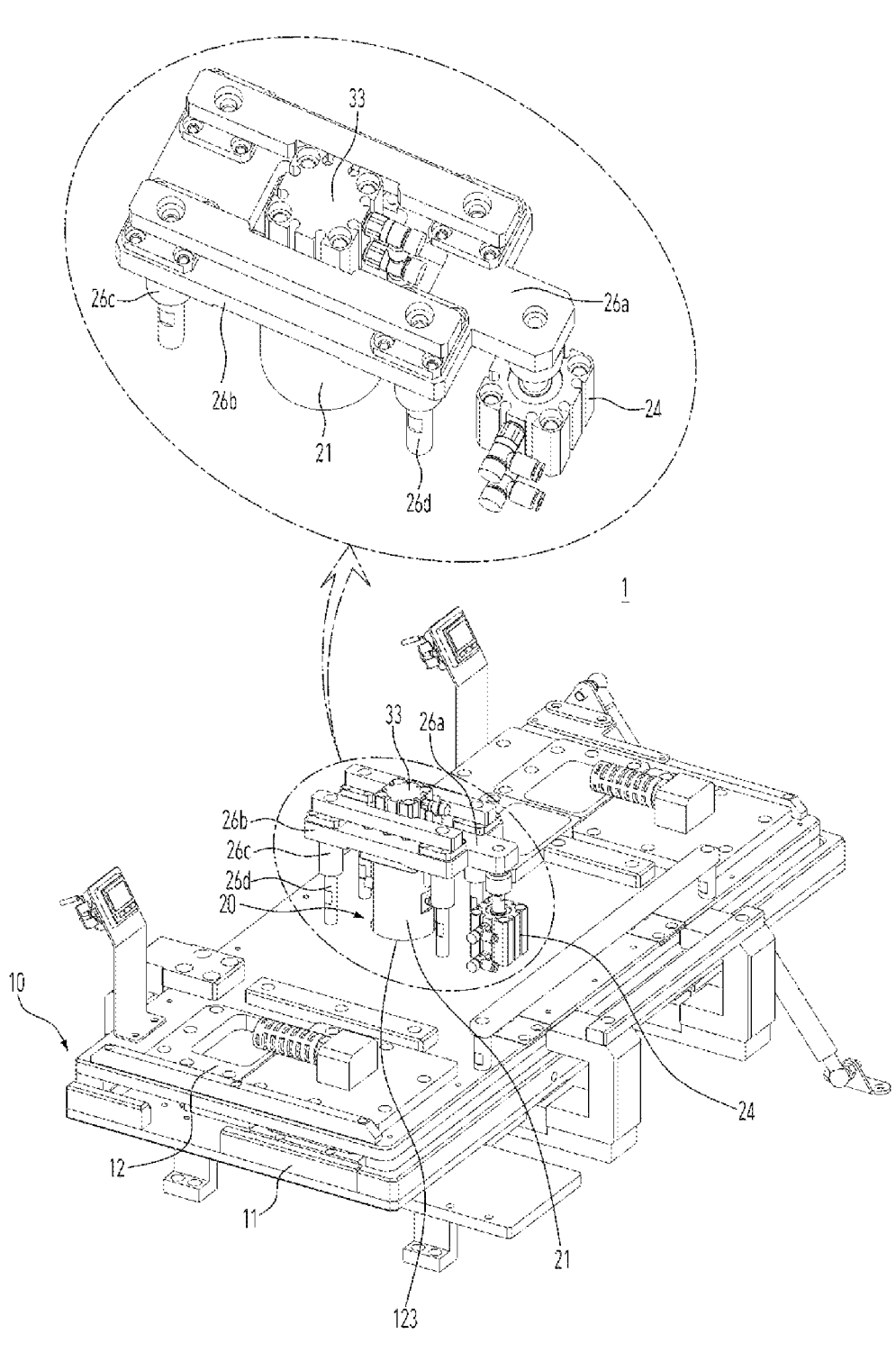
FIG. 1 is a perspective view showing the device for withstand pressure evaluation of the secondary battery according to an embodiment of the present disclosure.

Advantages and characteristics of the present disclosure, and methods for achieving them become clear with reference to the embodiments described later in detail. However, the present disclosure is not limited to the embodiments disclosed below, but may be implemented in various different forms, only these embodiments are provided to make the disclosure of the present disclosure complete and completely inform those skilled in the art of the scope of the invention to which the present disclosure pertains, and the present disclosure is only defined by the scope of the claims. Like reference numbers designate like elements throughout the specification.

Hereinafter, embodiments of the present disclosure are described in detail with reference to the accompanying drawings so that those skilled in the art can easily carry out the present disclosure. However, the present disclosure may be embodied in many different forms and is not limited to the embodiments described herein. Like reference numerals have been assigned to like elements throughout the specification.

Figure 2:
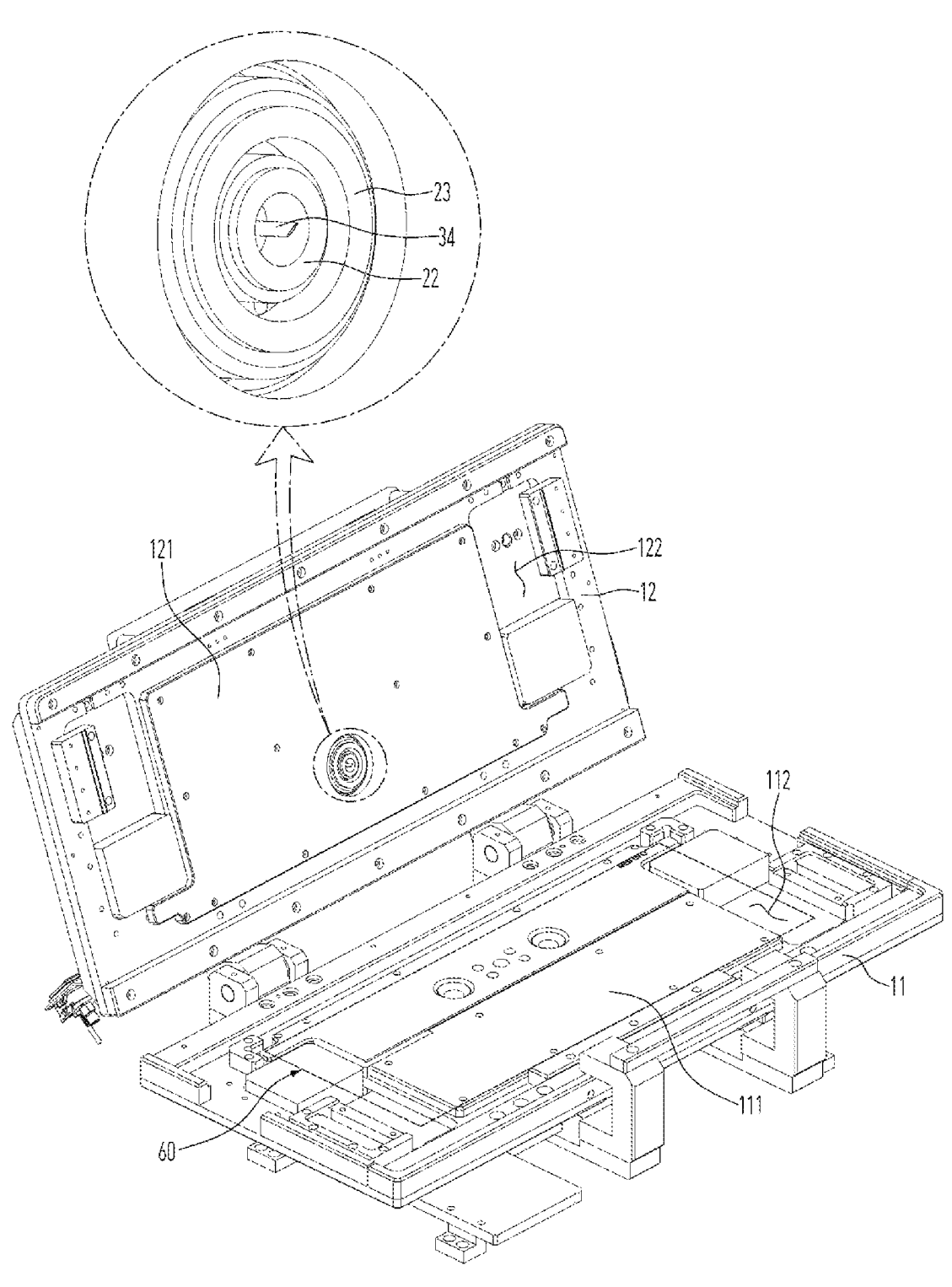
FIG. 2 is a perspective view showing the cover part in an open state in the device for withstand pressure evaluation of the secondary battery according to an embodiment of the present disclosure.
Figure 3:
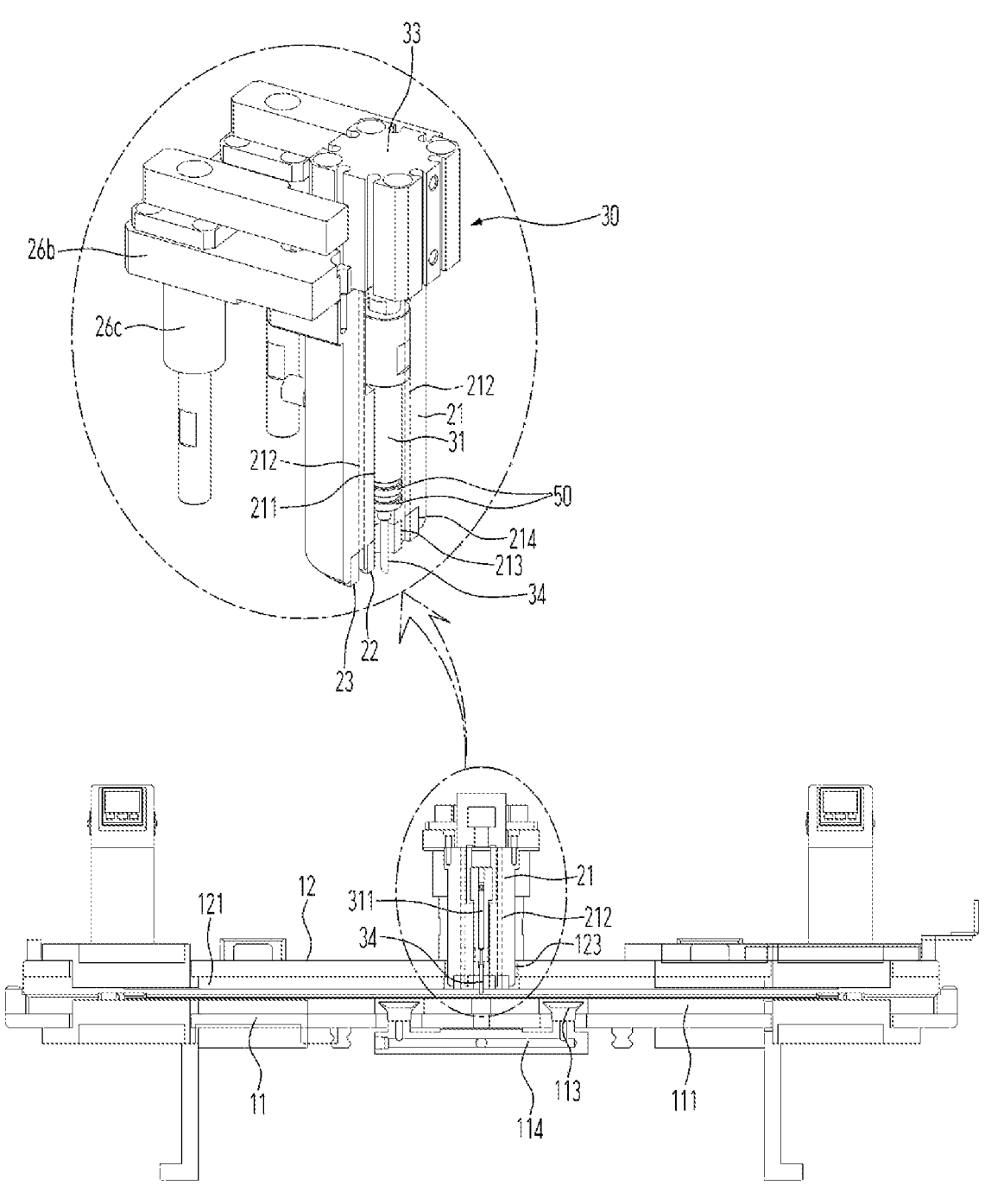
FIG. 3 is a cross-sectional view showing the device for withstand pressure evaluation of the secondary battery according to an embodiment of the present disclosure.
Figure 4:
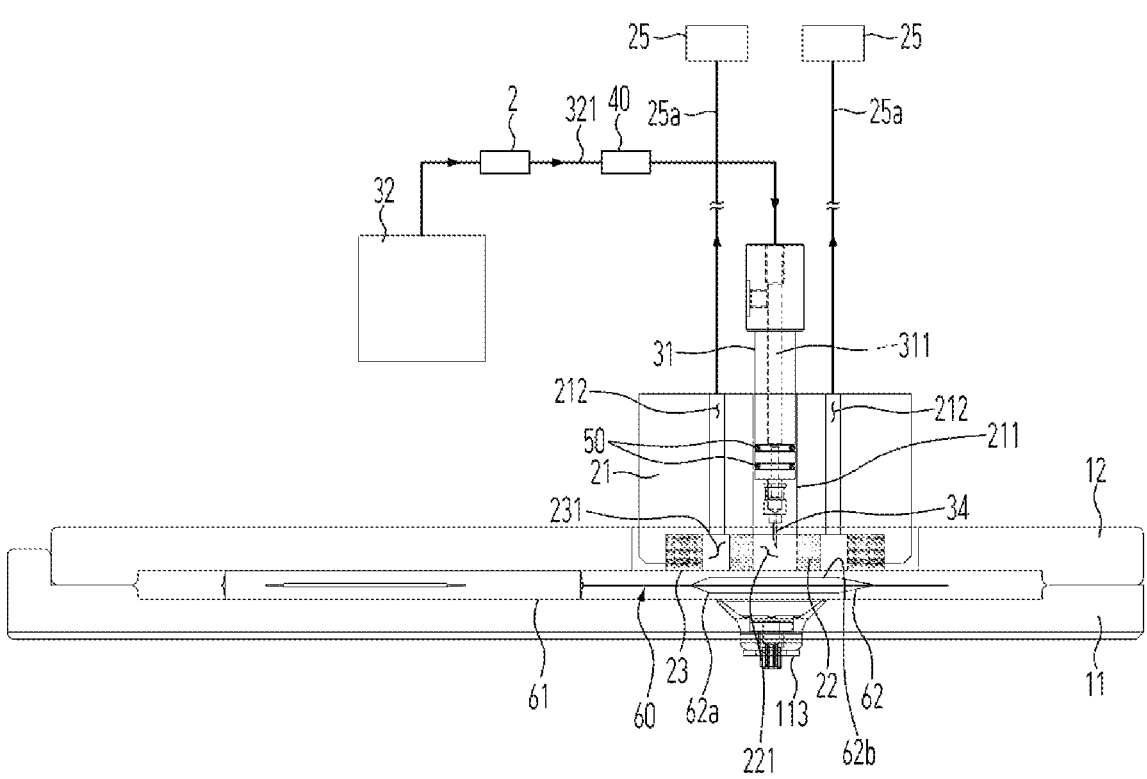
FIGS. 4, 5, 6, 7, and 8 are cross-sectional views showing step by step the process of evaluating the withstand pressure of the secondary battery through a device for withstand pressure evaluation of secondary battery according to an embodiment of the present disclosure.

FIG. 1 is a perspective view showing the device for withstand pressure evaluation of the secondary battery according to an embodiment of the present disclosure, FIG. 2 is a perspective view showing the cover part in an open state in the device for withstand pressure evaluation of the secondary battery according to an embodiment of the present disclosure, FIG. 3 is a cross-sectional view showing the device for withstand pressure evaluation of the secondary battery according to an embodiment of the present disclosure, and FIGS. 4, 5, 6, 7, and 8 are cross-sectional views showing step by step the process of evaluating the withstand pressure of the secondary battery through the device for withstand pressure evaluation of secondary battery according to an embodiment of the present disclosure.

The device for withstand pressure evaluation of a secondary battery 1 according to the present disclosure is a product that can ensure the stability of the product by evaluating the internal pressure of the pouch 60 constituting the secondary battery.

At this time, the pouch 60 may largely include a cell body 61 and a cell pocket 62. The cell body 61 and the cell pocket 62 can be formed as one piece by sealing the edges of the first surface 62a and the second surface 62b, which are formed of the same material and size.

Further, electrode tabs are coupled to one side and the other side of the cell body 61 through sealing, respectively.

Furthermore, the cell body 61 accommodates the electrode assembly and the electrolyte therein, and the cell pocket 62 is used to remove gas present inside the cell body 61.

In the present disclosure, the cell pocket 62 may also be used to inject air into the cell body 61.

In the present disclosure, air may be injected into the cell body 61 to evaluate the internal pressure.

In this way, the device for withstand pressure evaluation of secondary battery according to the present disclosure may include at least one of the storage 10, the spacer 20, injector 30, adsorption part 113, and pressure measuring unit 40.

The storage 10 may include at least one of the storage body 11 and the cover part 12.

The storage main body 11 has an open upper surface and a storage space in which the secondary battery is stored is formed therein.

The first support plate 111 is formed in the storage space of the storage body 11 to commonly support the bottom surfaces of the cell body 61 and the cell pocket 62.

The first support plate 111 may form the bottom surface of the storage main body 11.

The width of the first support plate 111 is formed to be shorter than the width of the storage main body 11.

Accordingly, the first expansion allowance holes 112 are formed on both sides of the first support plate 111 to allow expansion of the cell body 61 and the cell pocket 62, respectively.

At this time, edge portions of the cell body 61 and the cell pocket 62, respectively, protrude to both sides of the first support plate 111 to be located above the first expansion allowance holes 112.

The cover part 12 may be formed in a substantially rectangular frame shape.

The cover part 12 is formed with a second support plate 121 that commonly presses and supports the upper surfaces of the cell body 61 and the cell pocket 62 on the opposite side of the pouch 60 where the first support plate 111 is in contact.

One edge portion of the cover part 12 is hinged to one edge portion of the storage main body 11.

Accordingly, the cover part 12 may be rotated in the up and down directions based on the hinge.

When the cover part 12 is rotated in upward direction, the second support plate 121 opens the upper surface of the storage main body 11, but when it is rotated in the downward direction, it is seated on the upper surface of the storage body 11 so that the second support plate 121 commonly presses and supports the upper surfaces of the cell body 61 and the cell pocket 62.

At this time, the drawing shows an example in which the first surface 62a is seated on the upper surface of the first support plate 111, and the second surface 62b is pressed by the second support plate 121.

The width of the second support plate 121 is formed to be shorter than the width of the cover part 12.

Accordingly, the second expansion allowance holes 122 are formed on both sides of the second support plate 121 to allow expansion of the cell body 61 and the cell pocket 62, respectively.

When the cover part 12 is rotated in downward direction and seated on the upper surface of the storage body 11, the upper surface opening of the storage body 11 is closed.

Further, when the cover part 12 closes the opening portion of the storage main body 11, the second expansion allowance holes 122 are positioned above the first expansion allowance holes 112, respectively.

Accordingly, both edge portions of the cell body 61 and the cell pocket 62 are positioned between the first expansion allowance holes 112 and the second expansion allowance holes 122, respectively, and the electrode tab is also positioned between the first expansion allowance holes 112 and the second expansion allowance holes 122, respectively.

Additionally, the lifting hole 123 through which the spacer 20 is lifted and lowered is formed in the cover part 12.

That is, the lifting hole 123 guides the lifting and lowering of the spacer 20.

The above-described cover part 12 may be maintained in close contact with the storage main body 11 through a toggle clamp (not shown). This toggle clamp may prevent the cover part 12 from being artificially opened during the process of evaluating the internal pressure of the pouch 60 of the secondary battery.

At this time, a plurality of toggle clamps may be applied to stably prevent artificial opening of the cover part 12.

The spacer 20 is configured to suck one side of the pouch 60 and then pull it to form a space inside the pouch 60. At this time, the spacer 20 may pull the second surface 62b of the cell body 61 or the cell pocket 62 from the pouch 60, and the drawing shows an example in which the cover part 12 is configured to pull the second surface 62b of the cell pocket 62.

This spacer 20 may include at least one of the lifting block 21, the adsorption unit, the moving drive unit 24, and the suction control unit 25.

The lower part of the lifting block 21 is accommodated in the lifting hole 123, and the remaining part protrudes upward from the cover part 12.

The lifting block 21 is lifted and lowered on the lifting hole 123 by the moving drive unit 24, which is described later.

The moving guide hole 211 is formed in approximately the center of the lifting block 21 to guide the lifting and lowering of the needle 34, which is described later.

Further, the intake hole 212, which is spaced apart from the moving guide hole 211 at a predetermined distance, is formed in the lifting block 21.

At least one intake hole 212 may be formed at regular intervals to sufficiently apply intake force to the second surface 62b.

On the bottom of the lifting block 21, the first fixing groove 213 and the second fixing groove 214, to which the first adsorption ring 22 and the second adsorption ring 23 are respectively fixed, are formed in spaces defined from each other.

The first fixing groove 213 and the second fixing groove 214 are arranged in a concentric circle, and the diameter of the first fixing groove 213 is smaller than the diameter of the second fixing groove 214.

The lifting plate 26a is coupled to the upper side of the lifting block 21.

The lifting plate 26a may include a hollow into which the upper portion of the lifting block 21 is inserted.

Accordingly, the lifting plate 26a is coupled to surround the upper side of the lifting block 21.

Lifting bars 26b are disposed on one side and the other side of the lifting plate 26a, respectively, and at least one lifting body 26c is formed on the bottom of the lifting bar 26b, in which the upper and lower surfaces of the lifting body are open, and an empty space is formed therein.

The drawing shows an example in which two lifting bodies 26c are formed on each lifting bar 26b.

Additionally, a through hole (not shown) is formed in the lifting bar 26*b*, which is arranged perpendicular to the empty space inside the lifting body 26*c*.

The respective lifting guides 26*d*, which are accommodated in empty spaces inside the lifting body 26*c* and have a pin-shape, are formed on the upper surface of the cover part 12.

There are four lifting guides 26*d*, and they are applied one-to-one to the lifting body 26*c*.

Accordingly, the lifting body 26*c* is guided to be lifted and lowered by the lifting guide 26*d* due to the operation of the moving drive unit 24, which is described later. Accordingly, the lifting bar 26*b*, the lifting plate 26*a*, the lifting block 21, and the needle 34, which is described later, are lifted and lowered together. At this time, when the needle 34 is lowered, it pierces the second surface 62*b* of the pouch 60, and when it is lifted, it is spaced upward from the second surface 62*b*.

Meanwhile, the adsorption unit is coupled to the lifting block 21 to face the pouch 60.

The adsorption unit adsorbs the second surface 62*b* to prevent air from leaking during the process of measuring the internal pressure of the pouch and may include at least one of the first adsorption ring 22 and the second adsorption ring 23.

The first adsorption ring 22 and the second adsorption ring 23 suck the second surface 62*b* through interaction during the process of measuring the internal pressure of the pouch.

The first adsorption ring 22 is inserted into and fixed to the first fixing groove 213.

The lower portion of the first adsorption ring 22 may protrude out of the first fixing groove 213 and come into contact with the second surface 62*b*.

The first adsorption ring 22 is formed in a ring shape to be connected to the moving guide hole 211 in the center and is formed with the first connection hole 221 through which the needle 34 passes.

The second adsorption ring 23 is inserted into and fixed to the second fixing groove 214.

The lower portion of the second adsorption ring 23 may protrude out of the second fixing groove 214 and come into contact with the second surface.

At this time, the second adsorption ring 23 may protrude to the same length as the first adsorption ring 22.

The second adsorption ring 23 is formed in a ring shape with a larger diameter than the first adsorption ring 22.

Accordingly, the first adsorption ring 22 is located inside the second adsorption ring 23, and the first adsorption ring 22 and the second adsorption ring 23 are arranged to form concentric circles with each other.

At this time, the inner periphery of the second adsorption ring 23 and the outer periphery of the first adsorption ring 22 are spaced apart from each other.

Further, the second connection hole 231 connected to the above-described intake hole 212 is formed between the second adsorption ring 23 and the first adsorption ring 22, that is, inside the second adsorption ring 23.

At this time, although not necessarily limited thereto, the width of the intake hole 212 may be formed to be smaller than the width of the second connection hole 231.

At this time, the device for the internal pressure evaluation of the secondary battery according to an embodiment of the present disclosure may be manufactured to include both the first adsorption ring 22 and the second adsorption ring 23, or only one of the first adsorption ring 22 and the second adsorption ring 23.

Further, when it includes only one of the first adsorption ring 22 and the second adsorption ring 23, the first connection hole is formed in the center of the first adsorption ring 22 or the second adsorption ring 23, and the second connection hole is formed around the first connection hole.

At this time, the second connection holes are used in the same number as the intake holes and are located on a vertical line with the intake hole.

The moving drive unit 24 is fixed to the upper surface of the cover part 12.

The moving drive unit 24 may be formed of anyone selected from a pneumatic cylinder, a hydraulic cylinder, or a cam, and an example formed of a pneumatic cylinder is shown in the drawing.

The piston of the moving drive unit 24 is coupled to the bottom of the lifting plate 26*a*.

The piston is lofted or lowered by pneumatic pressure being injected or discharged from the moving drive unit 24.

When the piston of the moving drive unit 24 is lifted, the lifting plate 26*a*, the lifting bar 26*b*, the lifting body 26*c*, the lifting block 21, the first adsorption ring 22, and the second adsorption ring 23 is lifted uniformly to allow the first adsorption ring 22, the second adsorption ring 23, and the needle 34 move away from the second surface 62*b*.

Then, when the piston of the moving drive unit 24 is lowered, the lifting plate 26*a*, the lifting bar 26*b*, the lifting body 26*c*, the lifting block 21, and the first adsorption ring 22, the second adsorption 23 and the needle 34 are lowered uniformly. At this time, when the first adsorption ring 22, the second adsorption ring 23, and the needle 34 are lowered, they approach the second surface 62*b*.

The suction control unit 25 adsorbs a certain area of the second surface 62*b* in the space between the first adsorption ring 22 and the second adsorption ring 23 and may be formed of a pump or a known product having an air suction function.

The suction control unit 25 has a pair of suction hoses 25*a* that are connected one-to-one to the intake holes 212 on the upper side of the lifting block 21. By the operation of the moving drive unit 24, the first adsorption ring 22 and the second adsorption ring 23 are lowered and come into contact with the second surface 62*b*, and the needle 34 pierces the second surface 62*b*. Then, air is injected into the inner space of the cell pocket 62 to expand it so that the suction control unit 25 operates to suction air.

When the suction control unit 25 operates to suction air, a certain area of the second surface 62*b* of the expanded cell pocket 62 is inserted into the connection hole of the first adsorption ring 22, and another certain area of the second surface 62*b* is adsorbed in the form of being inserted into the space between the first adsorption ring 22 and the second adsorption ring 23, thereby maintaining airtightness.

Further, air may leak through the pierced portion of the second surface 62*b*, but the first suction ring 22 primarily prevents air leakage from the inside of the second adsorption ring 23 and the second adsorption ring 23 secondarily prevents air leakage from the outside of the first adsorption ring 22.

At this time, when the second surface 62*b* is adsorbed in the space between the first adsorption ring 22 and the second adsorption ring 23, the piston of the moving drive unit 24 can be programmed to gradually be lifted. Accordingly, the lifting plate 26*a*, the lifting bar 26*b*, the lifting body 26*c*, the lifting block 21, the first adsorption ring 22, and the second adsorption ring 23 are lifted simultaneously so that the second surface 62*b* is spaced apart from the first surface 62*a*.

Meanwhile, the injector 30 injects air into the inner space of the cell pocket 62 when the first surface 62a and the second surface 62b are separated by the spacer 20, and may include at least one of the needle 34, the housing 31, the needle drive unit 33, and the air supply unit 32.

The needle 34 is configured to pierce the second surface 62b. The needle 34 has a shape similar to a syringe needle, and its inner space is used as an air injection passage for injecting air into the inner space of the cell pocket 62.

Packing parts 50 are installed on the outer periphery of the needle 34 at regular intervals to maintain airtightness.

While the packing part 50 is accommodated in the moving guide hole 211 of the lifting block 21, its peripheral surface is in close contact with the inner peripheral surface of the lifting block 21. As a result, even if the air injected into the cell pocket 62 leaks out and flows into the moving guide hole of the lifting block 21, the packing part 50 blocks the air, thereby preventing gas from leaking to the outside through the moving guide hole 211.

At this time, the packing part 50 may be mounted on the outer periphery of the housing 31 instead of the needle 34 or may be mounted on the needle 34 and the housing 31, respectively.

The housing 31 is accommodated in the moving guide hole 211.

The housing 31 is formed with storage space inside which the upper portion of the needle 34 is accommodated.

Inside the housing 31, the third connection hole 311 connected to the air injection passage is formed in the vertical direction.

Air may be injected into the air injection passage through the third connection hole 311.

The needle drive unit 33 is fixed to the upper surface of the cover part 12.

The needle drive unit 33 may be formed of any one of a pneumatic cylinder, a hydraulic cylinder, or a cam, and an example formed of a pneumatic cylinder is shown in the drawing.

The piston of the needle drive unit 33 is coupled to the lifting plate 26a.

Accordingly, as pneumatic pressure is injected or discharged from the needle drive unit 33, the piston is lifted or lowered, which causes the lifting block 21, the housing 31, and the needle 34 to be lifted or lowered uniformly.

Further, when the needle 34 is lowered, it pierces the second surface 62b so that a certain portion of the lower portion is accommodated in the inner space of the cell pocket 62.

The air supply unit 32 is installed on the upper surface of the cover part 12.

The air supply unit 32 may be formed of a product such as a pump or an air compressor with an air injection function.

The air supply unit 32 has its own injection line 321 connected and installed on the upper side of the third connection hole 311 and supplies air to the injection line 321 at a positive pressure when the needle 34 pierces the second surface 62b and is accommodated inside the cell pocket 62.

At this time, the air supplied to the injection line 321 is injected into the space between the first surface 62a and the second surface 62b through the third connection hole 311 and the air injection passage of the needle 34.

At this time, the injection line 321 may be formed of any one of a pipe, piping, or hose.

Further, an electro-pneumatic regulator 2 may be installed in the injection line 321 to set and control the air pressure.

At this time, even if the spacer 20 separates the second surface 62b from the first surface 62a and the needle 34 pierces the second surface 62b, if the air supply unit 32 does not operate, the inner space of the pouch 60 and the space between the outside of the needle 34 and the packing part 50, atmospheric pressure is maintained so that gas, electrolyte, air, etc. inside the pouch 60 do not leak to the outside.

The adsorption part 113 is embedded in the storage main body 11, and its upper surface faces the bottom of the first surface 62a of the cell main body 61 or the cell pocket 62.

The adsorption part 113 has a wide at the top and narrow at the bottom shape like a general adsorption plate or hopper.

The upper and lower surfaces of the adsorption part 113 are open, and a suction space is formed inside.

The lower side of the adsorption part 113 protrudes toward the lower side of the storage main body 11.

At least one adsorption unit 113 may be applied, and one vacuum suction pipe 114 is connected to the bottom opening.

Further, a product such as a pump (not shown) or an air compressor with an air suction function (not shown) is connected to the vacuum suction pipe 114.

The adsorption part 113 may be made of any one of silicone, rubber, and soft synthetic resin materials so as to be in close contact with and suck the first surface 62a.

Before the spacer 20 pulls the second side 62b, the pump or product performs a suction operation so that the first side 62a is adsorbed on the adsorption part 113.

Accordingly, when the spacer 20 operates, the second surface 62b is spaced apart from the first surface 62a, thereby forming a space into which air can be injected into the pouch 60.

The pump, product, and vacuum suction pipe 114 may be lifted and lowered by a cylinder (not shown) or a cam.

Thus, the adsorption part 113 is also lifted and lowered, and when the adsorption part 113 is lifted, the upper side contacts and adsorbs the first surface 62a seated on the upper surface of the first support plate 111.

Further, when the adsorption part 113 is lowered, it is hidden in the internal space of the storage main body 11 to be spaced apart from the first surface 62a.

The pressure measuring part 40 is applied as a general product that can measure pressure, such as a pressure gauge.

The pressure measuring part 40 is installed in the injection line 321 and measures the pressure of air flowing along the injection line 321 or the internal pressure of the injection line 321.

The injection line 321 is connected to the third connection hole 311, and the third connection hole 311 is connected to the air injection passage of the needle 34 so that the pressure measuring part 40 may measure the pressure of air injected into the inside of the pouch 60 in the space connected to the air injection passage.

Next, a method for evaluating the withstand pressure of a secondary battery using the withstand pressure evaluation device of the secondary battery 1 described above is described with reference to FIGS. 4, 5, 6, 7, and 8.

First, the pouch 60 is stored in the storage space of the storage main body 11, and then the cover part 12 is closed to close the storage space.

At this time, the first surface 62a is supported by the first support plate 111, and the second surface 62b faces the second support plate 121.

Further, the edge of the cell body 61 and the edge of the cell pocket 62 and both electrode tabs installed on the edge are exposed and positioned on the first expansion allowance hole 112 and the second expansion allowance hole 122.

At this time, the edge areas on both sides of the cell body 61 where the electrode tabs are located may be subject to a withstand pressure test because the sealing strength of that area is weaker than that of other areas.

Afterwards, (a) the spacer 20 sucks one side of the pouch 60 stored in the storage 10 and then pulls it to form a space inside the pouch 60.

Figure 5:
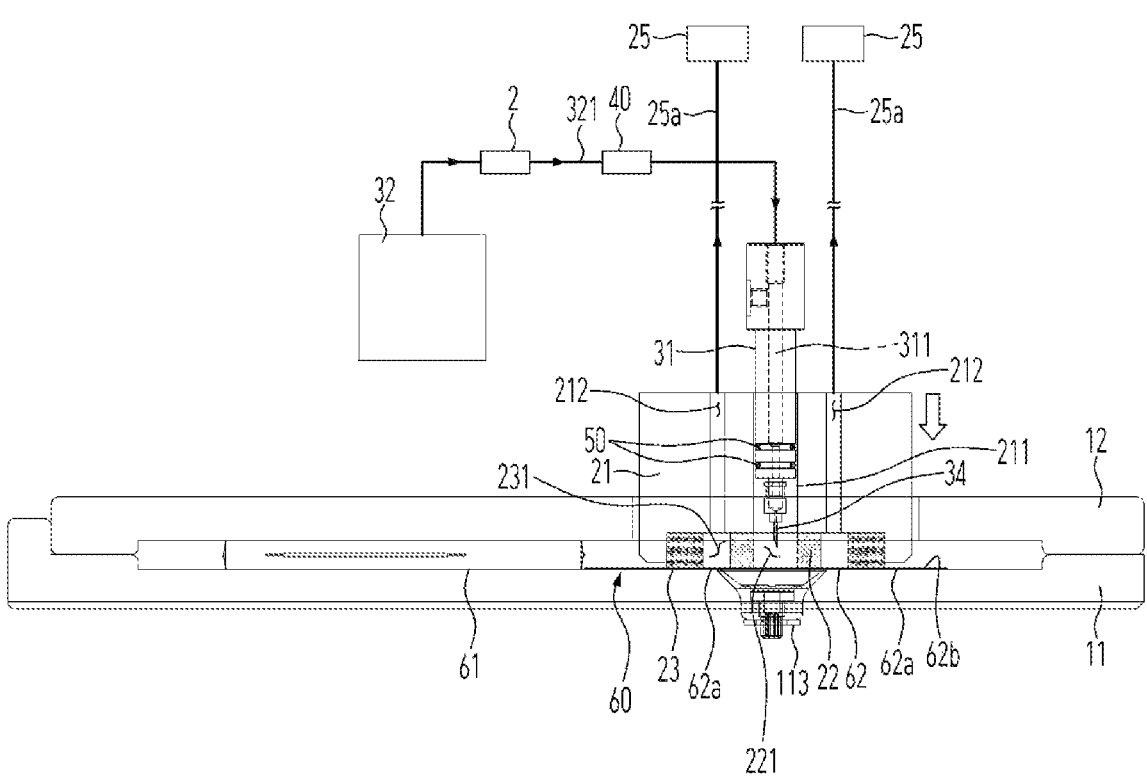

To explain this in more detail, the moving drive unit 24 lowers the lifting block 21, so that as shown in FIG. 5, the first adsorption ring 22 and the second adsorption ring 23 are brought into contact with the second surface 62*b*.

Subsequently, when the first adsorption ring 22 and the second adsorption ring 23 come into contact with the second surface 62*b*, the suction control unit 25 sucks the second surface 62*b* to the adsorption ring through air suction.

Figure 6:
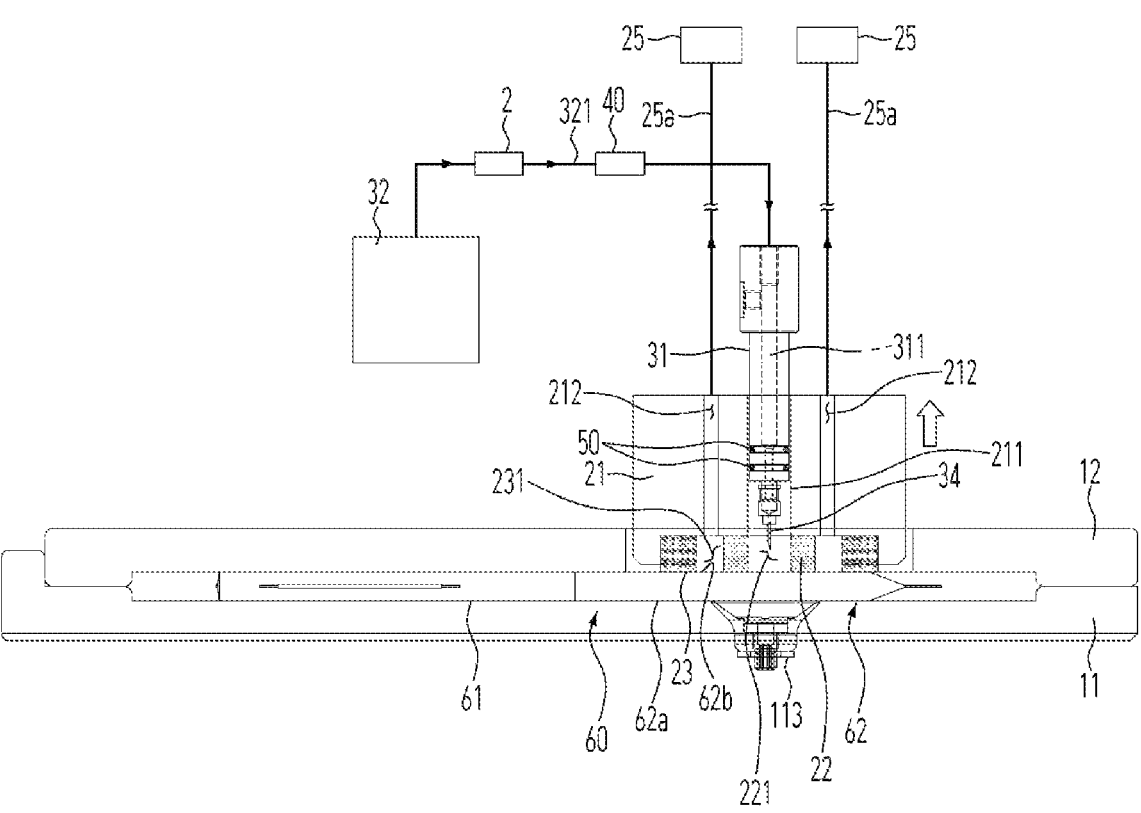

Afterwards, as shown in FIG. 6, the moving drive unit 24 lifts the lifting block 21 to space the second surface 62*b* above the first surface 62*a*, thereby forming a space inside the pouch 60.

At this time, before or after the first adsorption ring 22 and the second adsorption ring 23 contact the second surface 62*b*, the adsorption part 113 maintains the first surface 62*a* in an adsorbed state.

The suction part 113 adsorbs and supports the first surface 62*a*, so that when the first adsorption ring 22 and the second adsorption ring 23 adsorbs and then lift the second surface 62*b*, it is possible to prevent the first side 62*a* from being lifted.

Thereafter, the needle 34 punches the second surface 62*b*, and then air is supplied to the inner space of the cell pocket 62 and the cell body 61 by the air supply unit 32.

Figure 7:
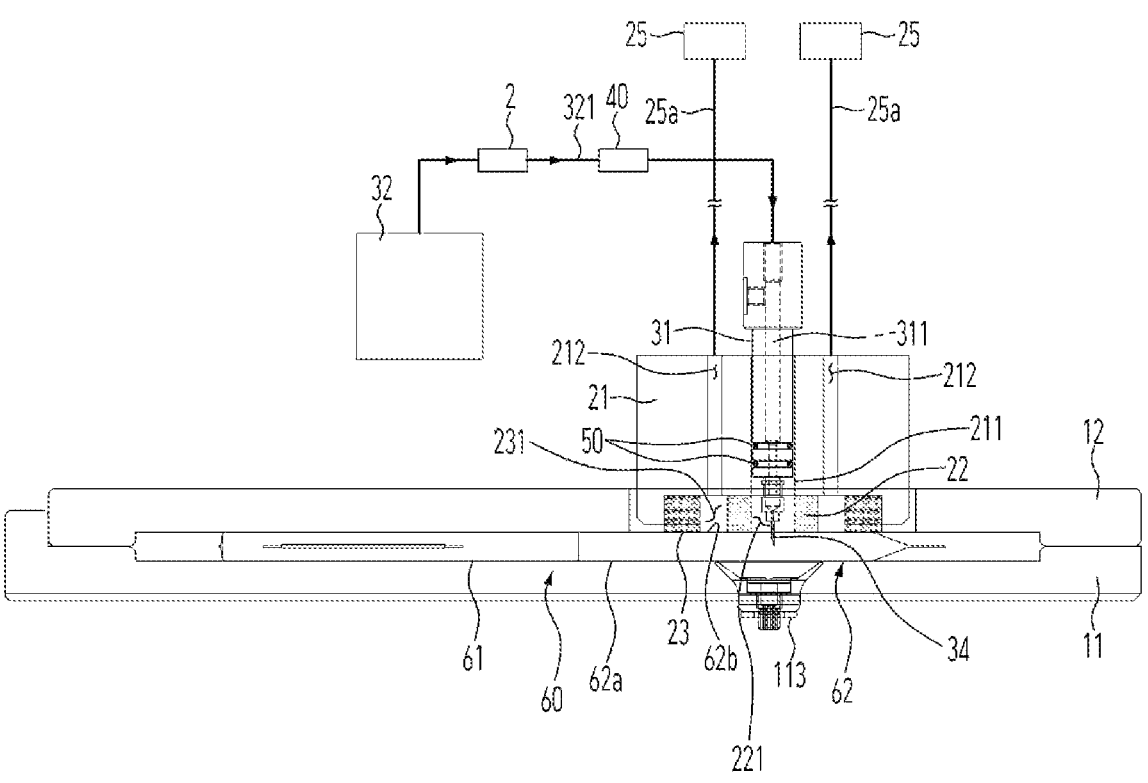

To explain this in more detail, the needle 34 is lowered by the needle driving unit 33 as shown in FIG. 7 and a portion of the needle 34 penetrates the second surface 62*b* and enters the inner space of the cell pocket 62.

Further, at the same time, the air supply unit 32 operates. Air from the air supply unit 32 is sequentially injected into the inside of the cell pocket 62 through the third connection hole 311 and the air injection passage.

At this time, the air supply unit 32 supplies air to the inside of the cell pocket 62 at a positive pressure.

Figure 8:
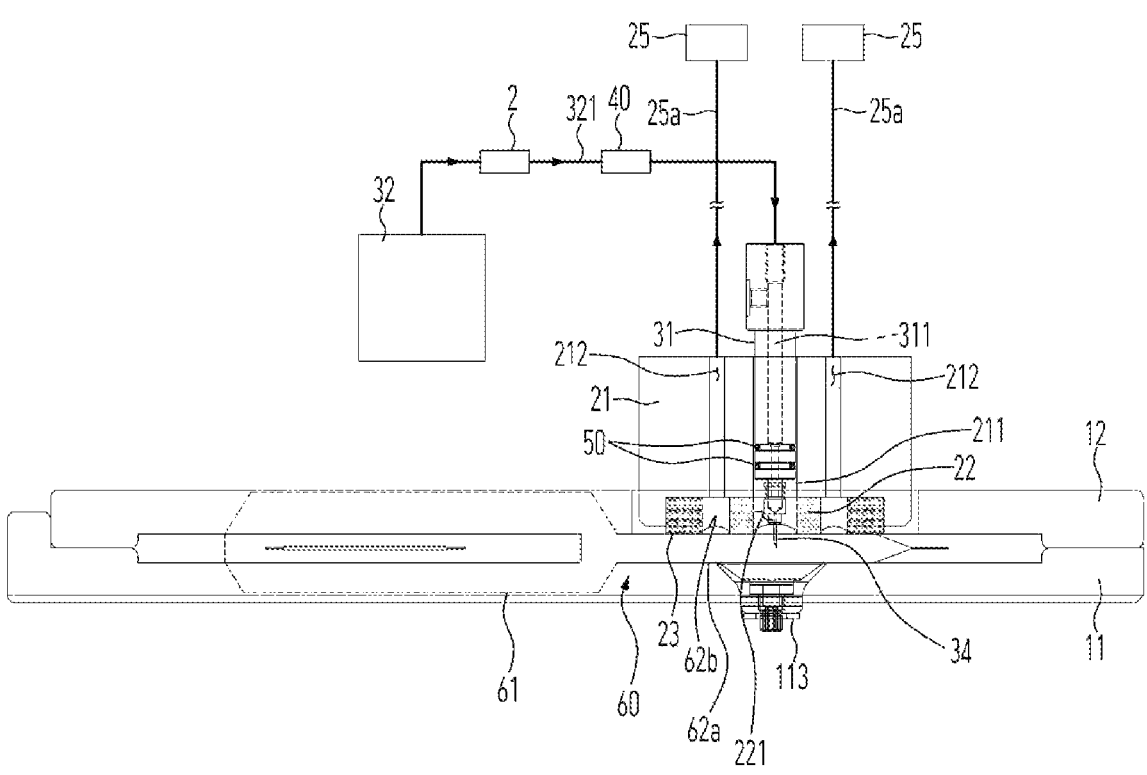

Since the inner space of the cell pocket 62 and the inner space of the cell body 61 are connected to each other, the air supplied to the cell pocket 62 also fills the cell body 61. Accordingly, the cell main body 61 and the cell pocket 62 expand as shown in FIG. 8.

At this time, the portion of the cell body 61, which is supported by the first support plate 111 and the second support plate 121 is expanded or not expanded below a predetermined level, and only a certain area of the cell body 61 and the cell pocket 62 located on the first expansion allowance hole 112 and the second expansion allowance hole 122 is expanded.

Thereafter, (c) when the air supply part 32 operates, the pressure measuring unit 40 measures the air pressure in the air injection passage.

Specifically, as the air supply unit 32 supplies air at a constant pressure, the internal pressure of the pouch 60 increases linearly and steadily, and a certain area of the cell body 61 and the cell pocket 62 located on the first expansion allowance hole 112 and the second expansion allowance hole 122 gradually expands and bursts at a limit point.

When the pouch 60 bursts, the constantly rising pressure within the pouch 60 drops, and the pressure measuring part 40 measures the point at which the pressure drops and the pressure at that point.

For example, the pressure measuring part 40 may include a display window that displays the measured pressure in numbers or scales.

In addition, the pressure measuring unit 40 may be programmed to provide the measured pressure to a display unit provided in the manager's PC.

The action of this pressure measuring part 40 allows the manager to determine the withstand pressure limit of the pouch 60.

As another example, the pressure change measured by the pressure measuring part 40 may be transmitted to an electrically connected visualization part (not shown). The visualization part may be formed by software and is programmed to graph the values measured by the pressure measuring part 40 and provide the graph to the display part provided in the touch panel device P or the manager's PC.

At this time, the visualization part may be installed in the touch panel device P or the manager's PC.

Additionally, the touch panel device P may be installed on the cover part 12 or may be installed separately at a predetermined distance apart from one side of the storage 10.

Figure 9:
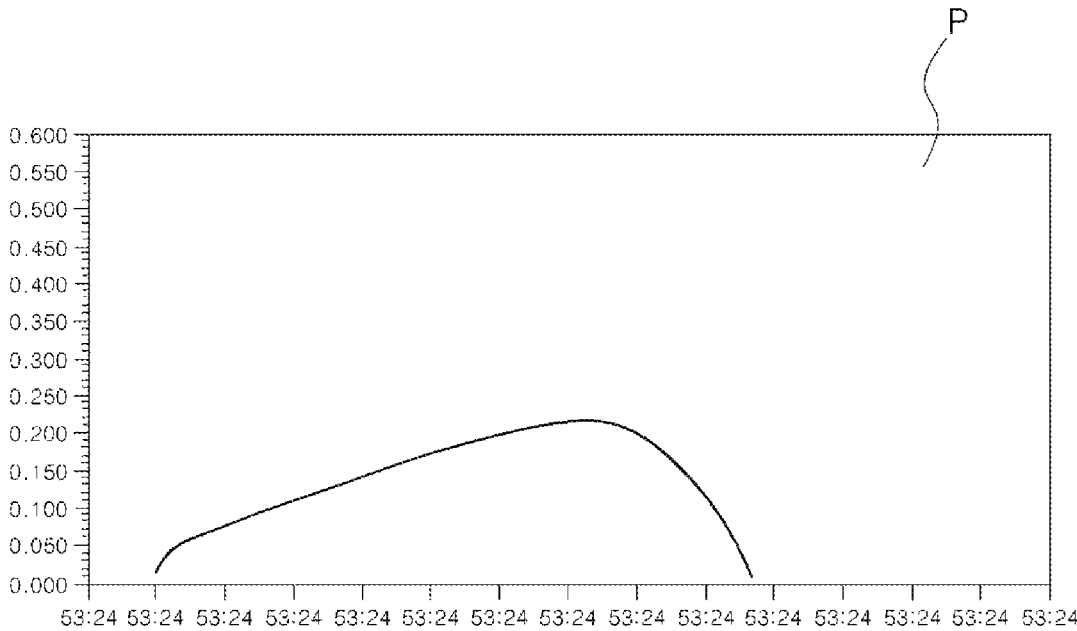
FIG. 9 is a graph measuring the withstand pressure of the secondary battery using the device for withstand pressure evaluation of the secondary battery according to an embodiment of the present disclosure.

The visualization part may convert the measured values of the pressure measuring unit into a graph as shown in FIG. 9.

At this time, the visualization part may convert the measured values into a graph including time on the horizontal axis and pressure on the vertical axis.

Further, the manager may identify the tendency to burst of the pouch 60 through the graph.

Specifically, the values of the pressure increase over time from the time when air is injected and the values of the pressure decrease after the maximum pressure are displayed in a graph, and the manager may identify the sealing breaking point of the cell body and cell pocket through the graph.

Then, the pressure is reduced at regular intervals from the determined breaking pressure, and the withstand pressure of the pouch 60 can be evaluated by finding the optimal offset value.

At this time, the device for withstand pressure evaluation of the secondary battery according to an embodiment of the present disclosure may further include an electro-pneumatic regulator 2 to set the pressure of the air supplied to the pouch 60 and is installed in the injection line 321 to collect accurate pressure data.

Ultimately, the present disclosure measures the internal pressure of pouches 60 of various sizes and allows managers to refer to them when manufacturing secondary batteries.

Those skilled in the art to which the present disclosure pertains understand that the present disclosure can be embodied in other specific forms without changing its technical spirit or essential features. Therefore, the embodiments described above should be understood as illustrative in all respects and not limiting. It should be interpreted that the scope of the present disclosure is indicated by the claims to be described later rather than the detailed description above, and all changes or modifications derived from the meaning and scope of the claims and equivalent concepts thereof are included in the scope of the present disclosure.

What is claimed is:

1. A device for pressure evaluation of a secondary battery, the device comprising:

a storage configured to have a storage space in which the secondary battery is stored;

a spacer configured to adsorb and then pull one side of the secondary battery to form an internal space of the secondary battery;

an injector configured to be installed in the spacer and pierce the secondary battery with a needle with an air injection passage formed therein, and inject air at positive pressure into the internal space of the secondary battery through the air injection passage; and a pressure measuring unit configured to measure air pressure in the internal space connected to the air injection passage.

2. The device of claim 1, wherein the storage comprises a storage main body having the storage space and including a first support plate supporting one side of the secondary battery and first expansion allowance holes on sides of the first support plate to allow expansion of the secondary battery; and a cover part opening and closing the storage space of the storage main body and including a second support plate supporting the secondary battery on the opposite side of the secondary battery to which the first support plate is in contact and second expansion allowance holes on sides of the second support plate to face the first expansion allowance holes, respectively, and allow expansion of the secondary battery.

3. The device of claim 2, wherein a lifting hole is formed in the cover part through which the spacer is lifted.

4. The device of claim 1, wherein the spacer comprises a lifting block including a moving guide hole guiding the movement of the needle and at least one intake hole applying an adsorption force to the secondary battery;

an adsorption unit coupled to the lifting block to face the secondary battery and including a first connection hole connected to a movement guide hole, which is through which the needle passes, and a second connection hole connected one-to-one with the intake hole;

a moving drive unit moving the lifting block so that the needle moves closer to or farther away from the secondary battery while allowing the adsorption unit to contact or separate from the secondary battery; and a suction control unit connected to the intake hole and sucking the secondary battery to the adsorption unit through air intake when the adsorption unit contacts the secondary battery.

5. The device of claim 4, wherein the adsorption unit comprises a first adsorption ring coupled to the lifting block and having the first connection hole formed thereon; and a second adsorption ring coupled to the lifting block and arranged to be concentric with the first adsorption ring, having a larger diameter than the diameter of the first adsorption ring, having the first adsorption ring located in the internal space thereof, and having the second connection hole.

6. The device of claim 1, wherein the injector further comprises: a housing receiving the needle and having a third connection hole connected to the air injection passage;

an air supply unit supplying air to the air injection passage through the third connection hole; and a needle-driving unit moving the housing in the direction of the secondary battery so that the needle pierces the secondary battery.

7. The device of claim 6, further comprising: a plurality of packing parts configured to be mounted on an outer periphery of the housing to be spaced apart from each other, wherein the outer periphery is in close contact with an inner periphery of the spacer.

8. The device of claim 6, wherein when the air supply unit is not operating, the pressure in an inside of the secondary battery and a space between an outside of the needle and the packing part is maintained at atmospheric pressure.

9. The device of claim 1, further comprising: an adsorption unit configured to be installed in the storage to adsorb and fix the secondary battery on the opposite side of the secondary battery that the spacer is in contact with.

10. A method for evaluating withstand pressure of a secondary battery, the method comprising:

step (a) of adsorbing and then pulling, by a spacer, one side of the secondary battery to form an internal space of the secondary battery;

step (b) of punching the secondary battery with a needle having an air injection passage formed therein and then injecting, by an air supply unit, air into the internal space of the secondary battery through the air injection passage; and step (c) of measuring, by a pressure measuring unit, the air pressure of the air injection passage.

11. The device of claim 10, further comprising: before or after step (a), a step of adsorbing, by an adsorption unit installed in a storage, the secondary battery on the opposite side of the secondary battery that is in contact with a spacer.

12. The device of claim 10, wherein step (b) comprises step (b1) of moving and inserting the needle into the secondary battery; and step (b2) of operating, when the needle is inserted into the secondary battery, the air supply unit to inject air into the secondary battery.

* * * * *